(12) United States Patent
Adams et al.

(10) Patent No.: US 6,830,061 B2
(45) Date of Patent: Dec. 14, 2004

(54) INTELLIGENT REGULATOR WITH INPUT/OUTPUT CAPABILITIES

(75) Inventors: Paul Robert Adams, Marshalltown, IA (US); Stephanie Marie Law, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 232 days.

(21) Appl. No.: 10/125,724

(22) Filed: Apr. 17, 2002

(65) Prior Publication Data

US 2002/0174899 A1 Nov. 28, 2002

Related U.S. Application Data

(60) Provisional application No. 60/287,050, filed on Apr. 27, 2001.

(51) Int. Cl.[7] .................................................. G05D 7/06
(52) U.S. Cl. ....................... 137/12; 137/487.5; 137/486
(58) Field of Search ............................... 137/487.5, 485, 137/486, 12, 1

(56) References Cited

U.S. PATENT DOCUMENTS

| | | |
|---|---|---|
| 5,451,923 A | 9/1995 | Seberger et al. |
| 5,684,451 A | 11/1997 | Seberger et al. |
| 5,878,765 A * | 3/1999 | Lange ..................... 137/487.5 |
| 5,964,446 A | 10/1999 | Walton et al. |
| 6,035,878 A | 3/2000 | Adams et al. |
| 6,056,008 A | 5/2000 | Adams et al. |
| 6,102,071 A | 8/2000 | Walton et al. |
| 6,178,997 B1 | 1/2001 | Adams et al. |
| 6,441,744 B1 * | 8/2002 | Adams et al. .............. 137/551 |
| 6,539,315 B1 | 3/2003 | Adams et al. |

OTHER PUBLICATIONS

U.S. Provisional patent application Ser. No. 60/287,050 entitled "Intelligent Regulator with Input/Output Capabilities," which was filed on Apr. 27, 2001.

"Bristol Babcock: 33xx Controllers and RTU's," Bristol Babcock, available at http://www.bristolbacock.com/products/33xx.htm.

* cited by examiner

Primary Examiner—Kevin Lee
(74) Attorney, Agent, or Firm—Marshall, Gerstein & Borun LLP

(57) ABSTRACT

An intelligent fluid flow regulation device that includes a pressure regulator within a fluid flow passage that has an associated throttling element moveable in the flow passage. A number of sensors in communication with the fluid flow passage and the throttling element are provided that communicate information from the sensors to a processor also contained within the regulation device. A communication unit is also included within the regulation device that affords communication between one or more devices that are external to the fluid flow regulation device and the processor within the regulation device.

25 Claims, 2 Drawing Sheets

INTELLIGENT REGULATOR WITH INPUT/OUTPUT CAPABILITIES

CROSS-REFERENCE TO RELATED APPLICATION

This application claims the benefit under 35 U.S.C. §119 (e) of U.S. provisional patent application Ser. No. 60/287,050 filed Apr. 27, 2001.

FIELD OF THE TECHNOLOGY

The present invention generally relates to regulators and, more particularly, to an intelligent regulator with input/output capabilities.

BACKGROUND

In the control of fluid in industrial processes, such as oil and gas pipeline systems, chemical processes, etc., it is often necessary to reduce and control the pressure of a fluid. Regulators are typically used for these tasks by providing adjustable flow restriction through the regulator. The purpose of the regulator in a given application may be to control flow rate or other process variables, but the restriction inherently induces a pressure reduction as a by-product of its flow control function.

By way of example, a specific application using regulators is the transmission and distribution of natural gas. A natural gas distribution system typically includes a piping network extending from a natural gas field to one or more consumers. In order to transfer large volumes of gas, the gas is compressed to an elevated pressure. As the gas nears the distribution grid and, ultimately, the consumers, pressure reducing stations reduce the pressure of the gas. The pressure reducing stations typically use regulators to reduce gas pressure.

Being capable of providing sufficient volumes of gas to consumers is important for natural gas distribution systems. System pressure, piping size, and the regulators typically determine the capacity of such systems, and system capacity is often evaluated using a simulation model. The accuracy of the system model is determined using flow data at various input points, pressure reducing points, and output points. The pressure reducing points significantly impact the capacity of the gas distribution system, and therefore simulating the pressure reducing points is important for the system model. These pressure reducing points, however, are within the distribution system and therefore are not considered custody transfer points (i.e., points at which the control of gas flow switches from the distribution system to the consumer). As a result, flow measurement is typically not provided at the pressure reducing points. Furthermore, since the pressure reducing points are not custody transfer points, the added cost of high accuracy is not required. Flow measurement problems similar to those described above with respect to natural gas distribution are also present in other regulator applications (i.e., industrial processes, chemical processes, etc.).

In addition, regulators are subject to failure due to wear during operation, thereby reducing the ability to control pressure along a pipeline. A damaged regulator may allow fluid to leak, thereby increasing fluid waste and possibly creating a hazardous situation. While damaged regulators may be repaired or replaced, it is often difficult to detect when a regulator has failed and determine which regulator is damaged. Detecting a failure and determining which regulator has failed is more difficult in a typical natural gas delivery system, where pipelines may run several miles. Accordingly, an apparatus that detects apparatus failure and identifies the location of the failure is greatly desired.

Additionally, distributed control is increasingly used for controlling industrial systems. In distributed control systems, control of component parts of a system, such as a gas pipeline system, for example, is performed within each of the respective components by including processing capability within the components. However, a central controller that communicates with components is still used to make control decisions for the system as a whole, program the system components, monitor system functions and mediate control between system components. Thus, although current distributed control systems provide some degree of autonomy to system components, the central controller still maintains a relatively high degree of control, especially when mediating between components of the system.

DETAILED DESCRIPTION OF THE PREFERRED EXAMPLES

An intelligent fluid regulator used in an industrial process has onboard processing capability to self-control the fluid regulation performed by the regulator through self-monitoring of internal conditions within the regulator. The regulator also has input/output capability to send and receive signals to and from other external components in the industrial process. Also, the regulator may utilize received signals to further refine the self-control process by taking into account information received in the signals. The regulator may additionally use received signals to monitor devices external to the regulator and, further, to generate signals that the regulator will send to control the external devices that are components within the industrial process. This capability affords reduction in the requirement for greater central processing capacity, by distributing control of components in the process to more localized control by other intelligent system components.

Figure 1:
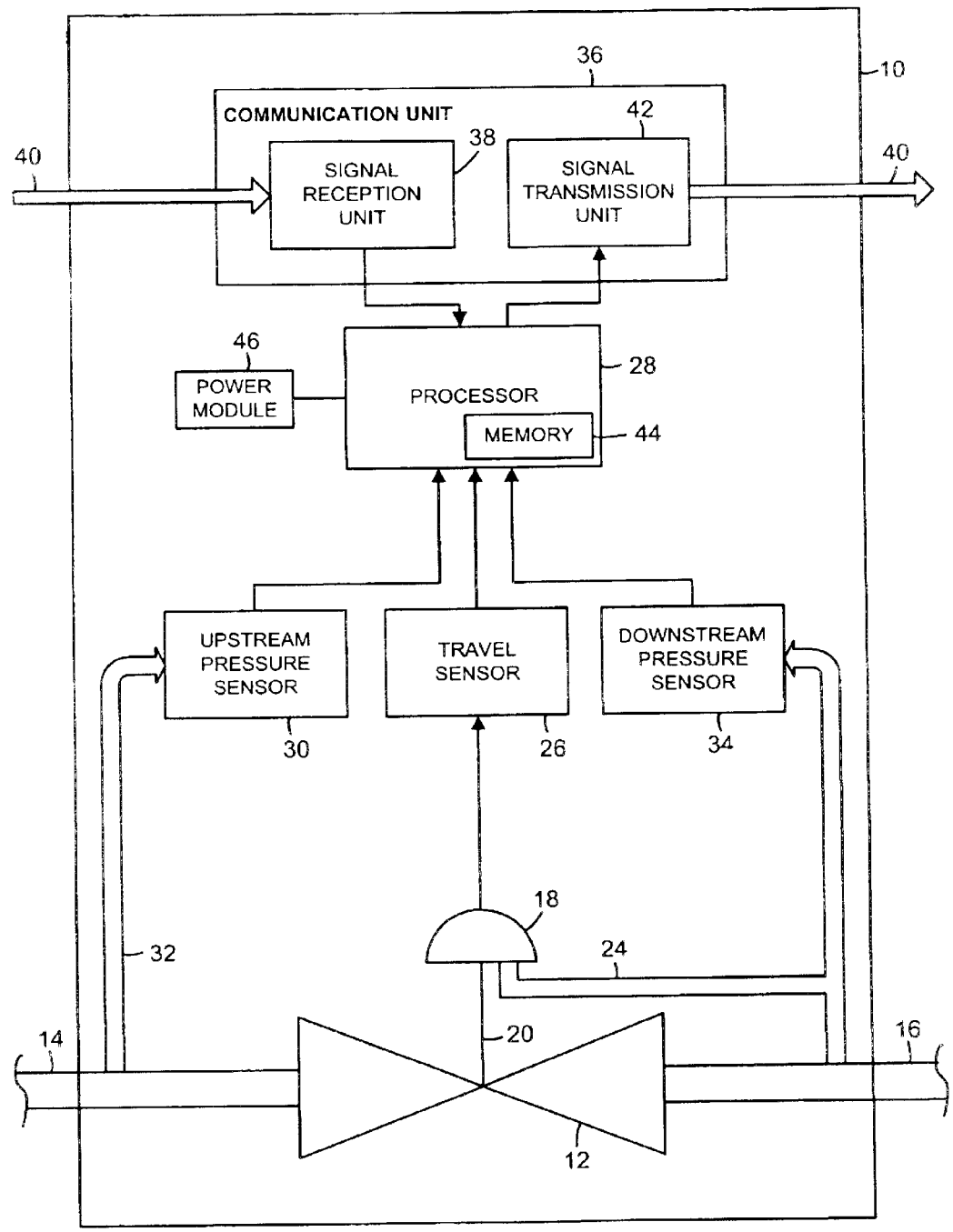
FIG. 1 is a schematic diagram illustrating an intelligent fluid pressure regulator with input/output capabilities in accordance with the teachings of the present disclosure.

FIG. 1 illustrates an example of a schematic for an intelligent fluid pressure regulator 10, such as gas and liquid pressure regulators, having input/output capabilities. The illustrated regulator 10 includes apparatuses for measuring fluid flow in a fluid flow passage, such as a gas pipeline, and a processor for effecting input/output communications and internal calculations. The apparatuses for measuring fluid flow include devices for measuring pressure, and devices for measuring orifice opening. Outputs of these devices are, in turn, used to calculate flow and other information.

As shown in FIG. 1, the regulator 10 includes a regulator body 12, which is connected to an upstream pipeline 14 and a downstream pipeline 16. An orifice (not shown) inside the regulator body 12 establishes flow between the upstream pipeline 14 and the downstream pipeline 16. Within the orifice, a valve disc (not shown), for example, operably moves to selectively occlude or partially occlude the orifice, effecting variable apertures for fluid flow through the orifice, so as to regulate the flow between the upstream pipeline 14 and downstream pipeline 16. Actuation to operably move the valve disc is accomplished with a throttling element 18 via a stem 20 attached to and moving the valve disc. The throttling element 18, as shown, may be powered pneumatically using pressure from the downstream pipeline 16 via a series of tubing connections 22, 24 coupled to pipeline or by some other energy source, such as electric power for an actuator or motor driver. It is noted that the regulator body 12 disclosed, and its described operation, are merely examples and other operable types of regulators known to those skilled in the art may also be utilized with the presently disclosed regulator 10.

A travel sensor 26 is connected to the throttling element 18 to sense or determine the position of the throttling element 16 as it drives the stem 20. The travel sensor 26, in turn, delivers a signal to a processor unit 28 representative of the position of the throttling element 18. While taking into account the particular geometry of the valve disc, the processor unit 28 uses this signal to determine the flow area within the regulator 12. The sensor 16 may comprise a Hall effect sensor, as an example, but other types of position sensors known in the art may be also used to determine the position of throttling element 18. Alternatively, the position of the valve disc may also be determined directly such as with radar transceivers, laser sensors or ultrasonic sensors.

Pressure sensors are provided upstream and downstream of the regulator body 12 to respectively measure upstream and downstream pressure levels. As illustrated in FIG. 1, an upstream pressure sensor 30 is provided for sensing the pressure of the upstream pipeline 14 via a tubing connection 32 in pressure communication with the pipeline 14. A downstream pressure sensor 34 is further provided for sensing the pressure of the downstream pipeline 16 via tubing connection 22 in pressure communication with the pipeline 16. Signals output from the pressure sensors 30, 34 are delivered to the processor unit 28.

As shown in FIG. 1, the processor unit 28 is integral within the confines of the regulator 10. This integration provides onboard processing intelligence for the regulator 28 in order to locally perform various monitoring, calculation and control functions. For example, the processor unit 28 receives the signals output from the pressure sensors 30, 34 and the travel sensor 26. Based on these received signals, the processor 28 may determine, for example, the flow through the variable orifice in the regulator body 12 according to any known equation or algorithm (which may be stored in the processor memory 44, for example) for calculating flow and utilize this determination to make control decisions used to control the regulator 10 or other external devices.

A communication unit 36 illustrated in FIG. 1 is also included integral within the regulator 10. This unit 36 includes a signal receiver unit 38 that receives signals input to the regulator 10 from external devices over a communication link or network 40. The signal reception unit 38, in turn, communicates received signals to the processor unit 28. Additionally, the communication unit 36 includes a signal transmission unit 42 in communication with the processor unit 28 that transmits signals issued from the processor 28 out over the communication link or network 40 to one or more external devices. Alternatively, instead of separate receiver and transmission units 38, 42, a single transceiver (not shown) for receiving and transmitting signals may be employed in the communication unit 36. The communication unit 36 may be configured to receive analog signals, such as 4–20 milliamp signals, digital signals, such as packet based protocol signals, pulse signals and pneumatic signals, as examples.

When the processor unit 28 receives signals input via the communication unit 36, the processor 28 is configured to perform a number of functions based on the type of received signal. For example, if the received signal is sent from external devices such as temperature measurement devices, seismic devices, level sensors, cathodic protection devices, etc., the processor 28 can function to monitor these input data and store this data in a memory 42 associated with the processor 28, the memory 44 located either internal to the processor 28, as shown, or external to the processor 28 (not shown). Monitoring functions may include maintaining time and/or duration stamped logs of selected performance parameters, errors, abnormalities, etc. Other types of signals received may be command signals or request signals received from other regulators, including intelligent regulators, other external devices, or a central controller or computer. Thus, the processor 28 is configured to respond to external controls that either direct it to modify the operation of the regulator 10, modify characteristics of the predefined relationship or algorithm, as mentioned previously, modify software or firmware within the processor 28 or assemble information to be transmitted in response to a request for information or data, such as status information.

The processor 28 is also configured to output signals to one or more external devices via the communication unit 36 and network 40. Types of signals that may be generated and output include control command signals and device specific setpoint signals for control of other external devices in communication with the regulator 10 via the network 40. It is further noted that the network may comprise a packet based protocol network requiring a single cable or may have numerous channels operating in parallel. Examples of packet based protocol and other types of networks that may be used include IP protocol, Ethernet or Digital Control System (DCS) networks. The network 40 may physically comprise a coaxial cable, twisted pair or optic fiber. Also, processor 28 may insert address information into output signals wherein one or more addressed recipient devices may recognize and receive each signal that is output including this address information by one or more addressed recipient devices connected to the network 40.

The regulator 10 may further include a power module 46 provided for powering the processor 28 and communication unit 36. The power module 46 is capable of providing regulated voltage for the entire device, and may be supplied by any known power source such as solar, battery, and DC or AC power sources. Alternatively, the processor 28 and communication unit 36 can be powered via a 4–20 milliamp connection to the communication unit 36 within the network 40.

As described above, the intelligent regulator 10 is typically connected to other external devices in an industrial system via a network 40. The processor 28 within the intelligent regulator 10 is configured to effect control of some of these other devices, particularly those devices that are local to the regulator 10 or within the same subsystem in the industrial system, for example. As mentioned previously, examples of these external devices include other flow regulators (including other intelligent regulators), various types of valves (e.g., control valves, safety valves, on/off valves), various sensors (e.g., temperature, methane gas, level, seismic), main line heater systems, transmitter, current/pressure transducers, odorant injection systems and cathodic protection systems, but are not limited to these few examples.

Figure 2:
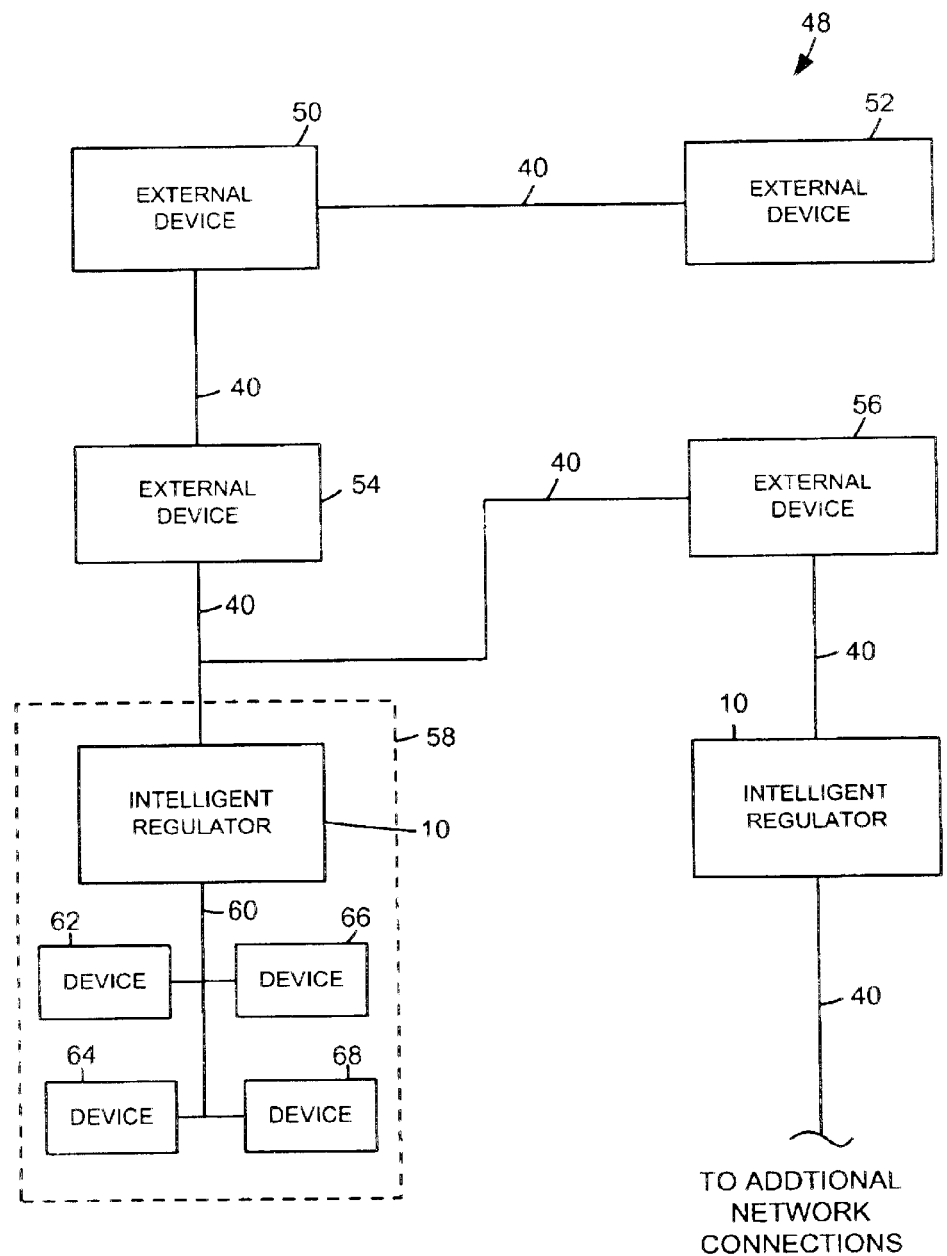
FIG. 2 is a diagram of a fluid flow management system using the intelligent regulator of FIG. 1.

An example of a system configuration utilizing the disclosed regulator 10 is illustrated in FIG. 2. In the illustrated system 48, an intelligent regulator 10 is shown connected to the network 40. Also in connection with the network 40 are various external devices 50, 52, 54, 56, which may be of any one of the above-enumerated devices or any other conceivable devices that may be used in industrial systems.

As an example, external device 50 may be an odorant injection system for a gas pipeline system. The processor 28 of the intelligent regulator 10, by way of the network 10, would issue control signals to the odorant injection system based on the detected flow rate determined within the regulator 10. That is, the regulator may transmit control or data signals, such a signal controlling the volume of odorant injected into a gas pipeline by the odorant injection system that is based on the flow rate determined by the processor 28.

As another example, the regulator 10 may be part of a self-contained package system 58. Here a network 60 serves to communicate inputs from various external devices within the package to the regulator 10. The regulator 10, in turn, may issue control signals to the various external devices 62, 64, 66, 68 within the system 58 or to other devices external to the system 58 over network 40, change the operation parameters of the regulator 10 itself based on the received inputs or input variables used for internal calculations within the processor 28. An instance of the latter may include receiving input from a fluid temperature monitor. Based on the measured fluid temperature, a flow rate is calculated using a formula taking into account the measured temperature of the fluid.

It will be appreciated by those skilled in the art that the processor 28, the communication unit 36 and the power module 44 may be separately provided as illustrated in FIG. 1, or may be provided on a single main circuit board located inside the housing of the regulator 10.

Although certain apparatuses constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A fluid flow regulation device comprising:
   a pressure regulator configured to be disposed in a fluid flow passage and having an associated throttling element moveable in the flow passage;
   a plurality of sensors, each sensor disposed in communication with at least one of the fluid flow passage, the pressure regulator and the throttling element;
   a processor in communication with the plurality of sensors that is configured to receive sensor signals output from the plurality of sensors; and
   a communication unit that is configured to communicate with a plurality of devices external to the fluid flow regulation device and to communicate with the processor, wherein the communication unit comprises a signal reception unit that is configured to receive device signals from one or more external devices and a signal transmission unit that is configured to transmit output signals received from the processor to external devices.

2. The device according to claim 1, wherein the device signals comprise one or more of analog signals, digital signals, pulse signals and pneumatic signals.

3. The device according to claim 1, wherein the output signals comprise one or more of analog signals, digital signals, pulse signals and pneumatic signals.

4. The device according to claim 1, wherein the processor is configured to calculate fluid flow in the pressure regulator using a flow equation stored in the processor.

5. The device according to claim 1, wherein the plurality of sensors include at least one of a first pressure sensor measuring an upstream pressure in the fluid flow passage at a portion upstream of the fluid regulator, a second pressure sensor measuring a downstream pressure in the fluid flow passage at a portion downstream of the fluid regulator and a travel sensor for determining a position of the throttling element.

6. A method for operating a fluid flow regulation device having a pressure regulator configured to be disposed in a fluid flow passage and an associated throttling element moveable in the flow passage, the method comprising:
   providing a plurality of sensors in communication with at least one of the fluid flow passage, the pressure regulator and the throttling element;
   transmitting signals from the plurality of sensors to a processor within the fluid flow regulation device that is in communication with the plurality of sensors; and
   providing communication between the processor and a plurality of devices external to the fluid flow regulation device, wherein the processor issues commands to at least one of the plurality of devices such that the communication between the processor and the plurality of devices external to the fluid flow regulation device is effected through a communication module comprising a signal reception unit that is configured to receive input signals from one or more external devices and a signal transmission unit that is configured to transmit output signals received from the processor to external devices.

7. The method according to claim 6, wherein the sensing signals, output signals and input signals comprise one or more of analog signals, digital signals, pulse signals and pneumatic signals.

8. The method according to claim 6, further comprising:
   calculating fluid flow within using a predetermined flow equation stored in the processor based on the sensing signals output by the plurality of sensors.

9. The method according to claim 6, wherein the plurality of sensors includes at least one of a first pressure sensor measuring an upstream pressure in the fluid flow passage at a portion upstream of the fluid regulator, a second pressure sensor measuring a downstream pressure in the fluid flow passage at a portion downstream of the fluid regulator and a travel sensor for determining a position of the throttling element.

10. A method according to claim 6, wherein the external devices comprises one or more of additional fluid flow regulation devices, control valves, safety valves, on/off valves, odorant injection systems, main-line heater systems, temperature sensors, methane sensors, level sensors, seismic sensors, current/pressure transducers and cathodic protection current sensors.

11. The method according to claim 10, further comprising: connecting the external devices with the fluid flow regulator via a data network.

12. The method according to claim 11, wherein the data network comprises a digital control system.

13. The method according to claim 11, wherein the data network comprises a data packet protocol network.

14. An intelligent fluid flow regulator comprising:
   a processor unit;
   a pressure regulator monitored and controlled by the processor unit; and
   a communication unit in communication with processor unit and configured to receive input signals and to transmit output signals between the processor unit and a plurality of devices external to the fluid flow regulator wherein the processor is further configured to perform control processing functions to generate control signals and to transmit the control signals as a portion of the output signals to one or more of the plurality of devices external to the fluid flow regulator.

15. The fluid flow regulator according to claim 14, wherein the communication unit is further configured to communicate with the plurality of devices external to the fluid flow regulator via a network connection linking the fluid flow regulator to the plurality of devices.

16. The fluid flow regulator according to claim 14, wherein the network connection is a digital network and the processor is configured to insert address information into one or more of the output signals that allows one or more intended recipient devices of the plurality of devices to recognize and receive the output signals.

17. The fluid flow regulator according to claim 16, wherein the network connection is configured to transmit at least one of analog signals, digital signals or packet based signals.

18. The fluid flow regulator according to claim 17, wherein the processor is configured to perform processing functions based on the received input signals and output signals to output one or more of the plurality of devices based on the performed processing functions.

19. An industrial system comprising:

a fluid flow regulator having a processor unit, a pressure regulator monitored and controlled by the processor unit and a communication unit in communication with processor unit; and a plurality of devices external to fluid flow regulator communicably interconnected by a network connection with one another and with the fluid flow regulator;

wherein the communication unit is configured to receive input signals and to transmit output signals between the processor unit and at least one of the plurality of devices external to the fluid flow regulator.

20. The system according to claim 19, wherein the plurality of devices comprise one or more of additional regulators, control valves, safety valves, on/off valves, odorant injection systems, main-line heater systems, temperature sensors, methane sensors, level sensors, seismic sensors, current/pressure transducers and cathodic protection current sensors.

21. The system according to claim 19, wherein the network connection is comprised of a packet based network, a digital control system or analog signaling.

22. A fluid flow management system comprising: at least one fluid flow regulation device having:

a pressure regulator configured to be disposed in a fluid flow passage and having an associated throttling element moveable in the flow passage;

a plurality of sensors, each sensor disposed in communication with at least one of the fluid flow passage, the pressure regulator and the throttling element;

a processor in communication with the plurality of sensors that is configured to receive sensor signals output from the plurality of sensors; and a communication unit; and a plurality of devices external to the at least one fluid flow regulation device;

wherein the communication unit is configured to effect communication between the plurality of devices external to the fluid flow regulation device and the processor, the external devices being connected in circuit with the regulator via a data network.

23. The system according to claim 22 wherein the plurality of external devices comprise one or more of additional regulators, control valves, safety valves, on/off valves, odorant injection systems, main-line heater systems, temperature sensors, methane sensors, level sensors, seismic sensors, current/pressure transducers and cathodic protection current sensors.

24. The system according to claim 22, wherein the data network comprises a digital control system.

25. The system according to claim 22, wherein the data network comprises a data packet protocol network.

* * * * *